(12) United States Patent
Lee et al.

(10) Patent No.: US 12,345,541 B2
(45) Date of Patent: Jul. 1, 2025

(54) CIRCUIT DRIVING GUIDE DEVICE AND METHOD THEREOF

(71) Applicants: HYUNDAI MOTOR COMPANY, Seoul (KR); KIA CORPORATION, Seoul (KR)

(72) Inventors: Jang Sun Lee, Incheon (KR); Seong Hun Nam, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 17/992,218

(22) Filed: Nov. 22, 2022

(65) Prior Publication Data

US 2023/0204373 A1 Jun. 29, 2023

(30) Foreign Application Priority Data

Dec. 29, 2021 (KR) .................. 10-2021-0191756

(51) Int. Cl.
*G01C 21/36* (2006.01)
*G06V 20/20* (2022.01)
(Continued)

(52) U.S. Cl.
CPC .......... *G01C 21/365* (2013.01); *G06V 20/20* (2022.01); *G06V 20/588* (2022.01);
(Continued)

(58) Field of Classification Search
CPC .................................................. G01C 21/365
See application file for complete search history.

(56) References Cited

U.S. PATENT DOCUMENTS 6,488,505 B1 12/2002 Hightower
7,216,035 B2 5/2007 Hortner et al.
(Continued)

FOREIGN PATENT DOCUMENTS

AU 2011293083 A1 * 2/2013 ............. B60Q 9/008
EP 4113459 A1 * 1/2023 ............ G06V 10/255
(Continued)

*Primary Examiner* — Shelley Chen
(74) *Attorney, Agent, or Firm* — Morgan Lewis & Bockius LLP (57) ABSTRACT

A circuit driving guide device includes at least one camera unit, disposed in a first vehicle, for acquiring driving information of the first vehicle driven on a driving route of a circuit and circuit information provided for each event occurring during driving on the driving route of the circuit, a communication module, disposed inside the first vehicle, for receiving, from a circuit server, map information of the driving route of the circuit and driving information of a second vehicle among one or more other vehicles driven on the driving route of the circuit, and a driving guide processor, disposed inside the first vehicle, for guiding a user in driving by analyzing the driving information of the first vehicle and the circuit information acquired from the at least one camera unit, and the map information and the driving information of the second vehicle provided from the communication module, and by applying an analyzed result value, obtained from the analyzing of the driving guide processor, to a driving rule of a preset circuit.

20 Claims, 7 Drawing Sheets

(51) Int. Cl.
*G06V 20/56* (2022.01)
*G09B 19/16* (2006.01)
*G09G 3/00* (2006.01)

(52) U.S. Cl.
CPC ........... *G09B 19/167* (2013.01); *G09G 3/001* (2013.01); *G09G 2380/10* (2013.01)

(56) References Cited

U.S. PATENT DOCUMENTS

| | | | | |
|---|---|---|---|---|
| 2005/0004723 | A1* | 1/2005 | Duggan | G05D 1/0061 |
| | | | | 701/13 |
| 2018/0341812 | A1* | 11/2018 | Floor | G06V 20/42 |
| 2019/0210591 | A1* | 7/2019 | Low | B60W 50/085 |
| 2022/0230436 | A1* | 7/2022 | Floor | G06V 20/42 |
| 2023/0386206 | A1* | 11/2023 | Agam | G06V 20/44 |

FOREIGN PATENT DOCUMENTS

| | | | | | |
|---|---|---|---|---|---|
| EP | 4459563 | A2 * | 11/2024 | ........... | G06V 10/255 |
| ES | 2593204 | T3 * | 12/2016 | ....... | G08G 1/096725 |
| JP | 2019119447 | A * | 7/2019 | ............ | B60W 30/02 |
| WO | WO-2023094247 | A1 * | 6/2023 | ......... | G08G 1/09623 |

\* cited by examiner

CIRCUIT DRIVING GUIDE DEVICE AND METHOD THEREOF

CROSS-REFERENCE TO RELATED APPLICATION

This application claims the benefit of Korean Patent Application No. 10-2021-0191756, filed on Dec. 29, 2021, which is hereby incorporated by reference as if fully set forth herein.

TECHNICAL FIELD

The present disclosure relates to a circuit driving guide device and a method thereof.

BACKGROUND

Conventional art has been utilized to increase driving immersion by displaying a virtual ghost vehicle based on a virtual current location of a vehicle in a racing game environment, which could be implemented based on GPS coordinates even on an actual circuit.

In addition, in guiding on a route to be taken, a method has been included to superimpose and express a virtual ghost vehicle on a surrounding image of a vehicle captured by a camera.

However, conventional technologies have a problem in that only interaction between a subject vehicle and a virtual ghost vehicle is assumed without considering actual surrounding vehicles other than the subject vehicle.

SUMMARY

Accordingly, the present disclosure is directed to a circuit driving guide device and a method thereof that substantially obviate one or more problems due to limitations and disadvantages of the related art.

An object of the present disclosure is to provide a real-time circuit driving guide device and a method thereof that may assist in improving driving skills and safe driving in an environment in which several vehicles are simultaneously driven since it is rare to drive alone on a circuit in an actual circuit driving environment.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a circuit driving guide device includes at least one camera unit disposed in a first vehicle, the at least one camera unit being configured to acquire driving information of the first vehicle driven on a driving route of a circuit and circuit information provided for each event occurring during driving on the driving route of the circuit, a communication module disposed inside the first vehicle, the communication module being configured to receive, from a circuit server, map information of the driving route of the circuit and driving information of a second vehicle among one or more other vehicles driven on the driving route of the circuit, and a driving guide processor disposed inside the first vehicle, the driving guide processor being configured to guide a user in driving by analyzing the driving information of the first vehicle and the circuit information acquired from the at least one camera unit, and the map information and the driving information of the second vehicle provided from the communication module, and by applying an analyzed result value, obtained from the analyzing of the driving guide processor, to a driving rule of a preset circuit.

In another aspect of the present disclosure, a circuit driving guide method includes acquiring, by a plurality of cameras disposed in a first vehicle, driving information of the first vehicle driven on a driving route of a circuit and circuit information provided for each event occurring during driving on the driving route of the circuit, receiving, from the circuit server, map information of the driving route of the circuit and driving information of a second vehicle among one or more other vehicles driven on the driving route of the circuit, and guiding, by a driving guide processor, a user in driving by analyzing the driving information of the first vehicle and the circuit information acquired from the plurality of cameras, and the map information and the driving information of the second vehicle provided from the circuit server under control of the driving guide processor, and applying an analyzed result value, obtained from the analyzing of the driving guide processor, to a driving rule of a preset circuit.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Throughout the specification, when a part "includes" a certain element, this means that other elements may be further included, rather than excluding other elements, unless stated otherwise. In addition, parts indicated with the same reference numerals throughout the specification mean the same elements.

In addition, a driving guide processor may be referred to as a driving guide control unit (DGU). The term "unit" or "control unit" included in names such as the DGU is only a widely used term for naming a controller for controlling a guide function for safely driving a vehicle, and does not mean a generic functional unit. For example, each control unit may include a communication device configured to communicate with another control device or sensor to control a function assigned thereto, a memory configured to store an operating system or logic command and input/output information, and one or more processors configured to perform determination, calculation, decision, etc. necessary for controlling the function assigned thereto.

Figure 1:
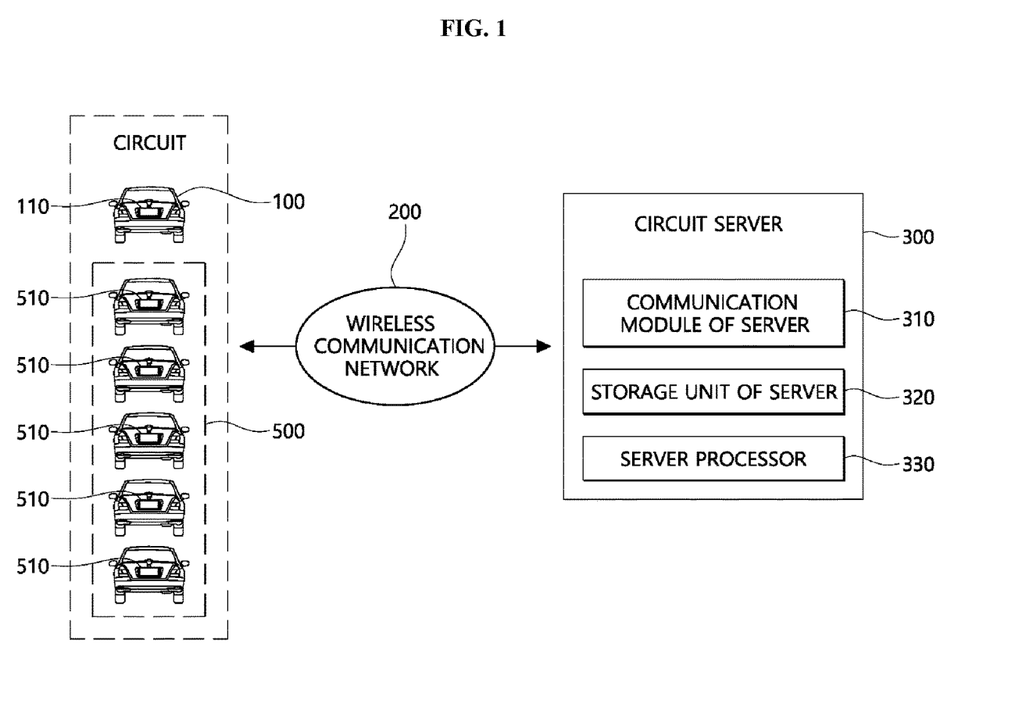
FIG. 1 is a diagram for describing a circuit driving guide system according to an embodiment of the present disclosure.

FIG. 1 is a diagram for describing a circuit driving guide system according to an embodiment of the present disclosure.

Referring to FIG. 1, the circuit driving guide system according to the embodiment of the present disclosure may include a circuit server 300, a plurality of vehicles 100 each including a circuit driving guide device 110, and a wireless communication network 200.

The circuit server 300 may register a plurality of maps related to a circuit and a plurality of vehicles 100, which is being driven on the circuit or is going to be driven on the circuit, in advance, and store the maps and vehicles in a storage unit 320 of the server. The circuit server 300 may collect driving information and customer data for the plurality of vehicles 100 registered in the storage unit 320 of the server at a preset cycle under control of a server processor 330 and store the collected information and data for each cycle. That is, the circuit server 300 may manage the driving information and the customer data in a database under the control of the server processor 330.

The circuit server 300 may receive driving information and location information for each of the plurality of vehicles 100 driven on the same circuit by performing real-time wireless communication with a communication module 310 of the server 300 under the control of the server processor 330, and may collect the information to provide the driving information and location information thereof to all the vehicles 100 and a plurality of other vehicles 500 driven on the circuit in real time.

Each of the vehicles 100 is a vehicle that is being driven on the circuit by a driver or a user, and may collect driving information, vehicle state information, etc. of the vehicle 100 at a preset cycle or in real time while being driven on a driving route of the circuit, and transmit the collected driving information and vehicle state information of the vehicle 100 to the circuit server 300.

The vehicles 100 may be driven together with the plurality of other vehicles 500 in the same time zone on the driving route of the circuit. The vehicles 100 and the plurality of other vehicles 500 may include circuit driving guide devices 110 and 510, respectively. The vehicles 100 and the plurality of other vehicles 500 may be safely driven on the circuit using the provided circuit driving guide devices 110 and 510, respectively. A detailed description of the circuit driving guide devices 110 and 510 will be given later.

The wireless communication network 200 may enable wireless data communication between the circuit driving guide device 110 and the circuit server 300.

Figure 2:
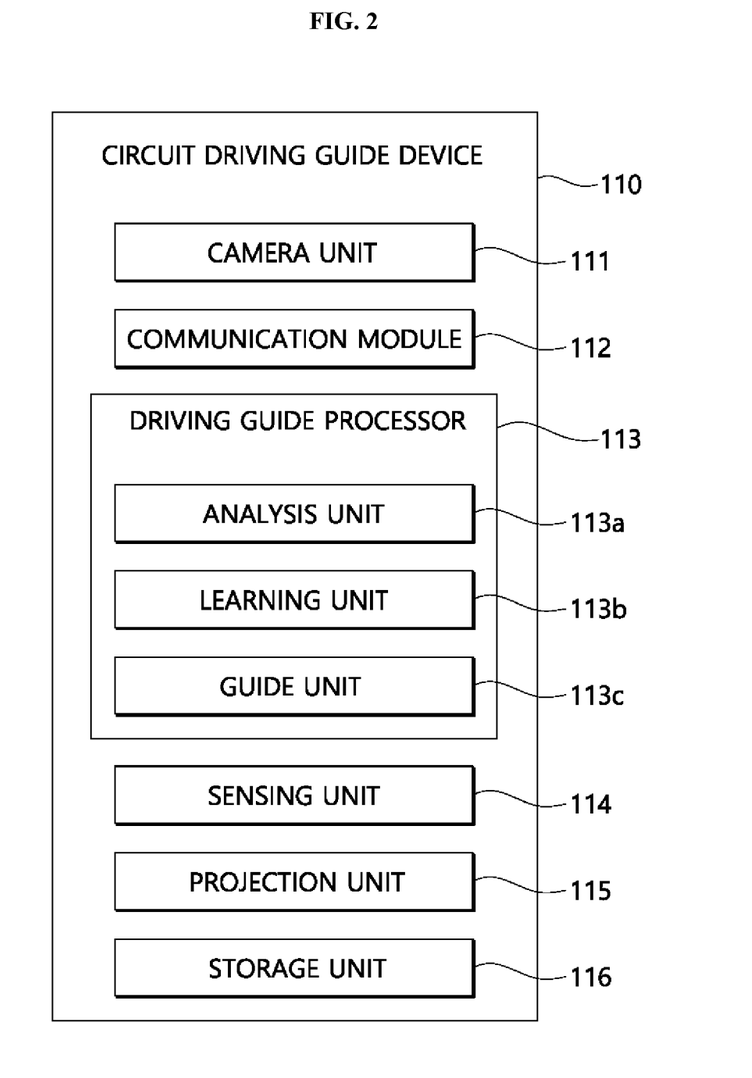
FIG. 2 is a diagram for describing a circuit driving guide device provided in a vehicle according to an embodiment of the present disclosure.

FIG. 2 is a diagram for describing the circuit driving guide device provided in the vehicle according to an embodiment of the present disclosure.

Referring to FIG. 2, the circuit driving guide device 110 according to the embodiment of the present disclosure may include a camera unit 111, a communication module 112, a driving guide processor 113, a sensing unit 114, a projection unit 115, and a storage unit 116.

At least one camera unit 111 is disposed in the vehicle 100, and the camera unit 111 may be a camera that acquires driving information of the vehicle 100 driven on the driving route of the circuit and circuit information provided for each event occurring while being driven on the driving route of the circuit. At least one camera unit 111 may be disposed at a front, rear, side, etc. of the vehicle 100 to acquire information about an object outside the vehicle 100 while being driven on the driving route of the circuit.

For example, the camera unit 111 may be mounted at a position where a field of view (FOV) can be ensured in the vehicle 100 in order to photograph the outside of the vehicle 100. The camera unit 111 may be disposed close to a front windshield in the interior of the vehicle 100 to acquire an image of an area in front of the vehicle 100. The camera unit 111 may be disposed around a front bumper or a radiator grill. The camera unit 111 may be disposed close to a rear window in the interior of the vehicle 100 to acquire an image of an area behind the vehicle 100. The camera unit 111 may be disposed around a rear bumper, a trunk, or a tail gate. The camera unit 111 may be disposed close to at least one of side windows in the interior of the vehicle 100 to acquire an image of an area next to the vehicle 100. Alternatively, the camera unit 111 may be disposed around a side mirror, a fender, or a door.

In addition, the camera unit 111 may acquire location information of an object, information about a distance from the object, or information about a relative speed with respect to the object under control of the driving guide processor 113. For example, the camera unit 111 may acquire the information about the distance from the object and the relative speed information from an obtained image, based on a change in size of the object over time. The driving guide processor 113 may include various image processing algorithms.

The driving information of the vehicle 100 is preferably data including at least one of a vehicle type, a vehicle speed, GPS, acceleration, deceleration, a driving road type of the circuit, a driving route of the circuit, or time and weather information detected by the camera unit 111 and the sensing unit 114 to be described later.

The circuit information may be information about displaying a flag appropriate to an event situation when the situation occurs on the circuit during circuit driving. The driving guide processor 113 to be described later may extract circuit information from the flag display acquired through the camera unit 111. A detailed description thereof will be provided later.

The communication module 112 may be a hardware device implemented by various electronic circuits, e.g., processor, transceiver, etc., to transmit and receive signals via wireless or wired connections. The communication module 112 may be disposed inside the vehicle 100, and may be provided with, from the circuit server 300, map information on the driving route of the circuit and driving information of the other vehicles 500 for at least one of the other vehicles 500 driven on the driving route of the circuit.

The communication module 112 may exchange various information or signals related to the vehicle 100 driven on the driving route of the circuit with the plurality of other vehicles 500 or the circuit server 300 located outside the vehicle 100. The communication module 112 may include at least one of a transmission antenna, a reception antenna, a radio frequency (RF) circuit capable of implementing various communication protocols, or an RF element to perform communication.

For example, the communication module 112 may use either one of C-V2X (Cellular V2X) technology or dedicated short range communications (DSRC) technology, or hybridize C-V2X technology and DSRC technology to exchange various information or signals related to the vehicle 100 driven on the driving route of the circuit with the plurality of other vehicles 500 or the circuit server 300.

The driving guide processor 113 may be disposed inside the vehicle 100 to analyze driving information of the vehicle 100 and circuit information acquired from the camera unit 111, map information provided from the communication module 112, and driving information of the other vehicle 500, and apply an analyzed result value to a driving rule of a preset circuit, thereby guiding the user in driving.

The driving guide processor 113 may receive information about GPS from an external server using the communication module 112, and check location information of the vehicle 100 driven on the driving route of the circuit based on the information.

The driving guide processor 113 may include a processor (e.g., computer, microprocessor, CPU, ASIC, circuitry, logic circuits, etc.) and an associated non-transitory memory storing software instructions which, when executed by the processor, provides the functionalities of an analysis unit 113*a*, a learning unit 113*b*, and a guide unit 113*c*. Herein, the memory and the processor may be implemented as separate semiconductor circuits. Alternatively, the memory and the processor may be implemented as a single integrated semiconductor circuit. The processor may embody one or more processor(s).

The analysis unit 113*a* (e.g., an antenna) may collect and analyze at least one of driving information of the vehicle 100, circuit information, map information, driving information of the other vehicles 500, vehicle state information, or a driving pattern of the user.

The learning unit 113*b* may learn by applying a result value analyzed through the analysis unit 113*a* to a driving rule of a preset circuit. The learning unit 113*b* may learn driving on the driving road of the circuit based on the analyzed result value, and may learn driving skills for enhanced driving by applying the learned driving to the driving rule of the preset circuit.

The driving rule of the circuit may be a rule for safely solving an event situation when the event situation occurs on the circuit while the vehicle 100 is driven on the driving road of the circuit by inducing the driving route to be changed to correspond to the event situation.

The guide unit 113*c* may guide the user in driving based on a driving guide program learned through the learning unit 113*b*. The guide unit 113*c* may set an optimal driving route for the driving route of the circuit based on the learned driving guide program, and guide the user in driving based on the set optimal driving route.

In addition, the driving guide processor 113 may divide the driving route of the circuit into a plurality of sections and control the driving route of the circuit for each section. The learned driving guide program may set the optimal driving route by dividing the driving route of the circuit for each section under control of the driving guide processor 113, and guide the user in driving based on the optimal driving route set for each section.

For example, the learned driving guide program may specifically guide the user in driving at, for example, a cornering course in a corner section, deceleration/gear shifting timing before entering the corner section, acceleration start/end timing in a straight section, etc. by dividing the driving route of the circuit for each section. The learned driving guide program may be projected on the windshield of the vehicle 100 through the projection unit 115 under control of the driving guide processor 113. A detailed description thereof will be provided later.

In addition, when at least one of the other vehicles 500 approaches within a preset range based on the vehicle 100, the driving guide processor 113 may perform a control operation to interact with driving information of the other vehicle 500 and change the preset optimal driving route.

At least one sensing unit 114 may be disposed in the vehicle 100 to sense vehicle state information and a driving pattern of the user in the vehicle 100 driven on the driving route of the circuit.

For example, the sensing unit 114 may include at least one of an inertial measurement unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, or a pedal position sensor.

Meanwhile, the IMU sensor may include one or more of an acceleration sensor, a gyro sensor, and a magnetic sensor.

The sensing unit 114 may generate vehicle state information and a driving pattern of the driver based on a signal generated by at least one sensor. The vehicle state information may be information generated based on data sensed by various sensors provided outside or inside the vehicle 100.

The sensing unit 114 may generate vehicle motion data, vehicle yaw data, vehicle roll data, vehicle pitch data, vehicle collision data, vehicle direction data, vehicle angle data, vehicle speed data, vehicle acceleration data, vehicle inclination data, vehicle forward/reverse data, vehicle weight data, battery data, fuel data, tire pressure data, vehicle interior (or exterior) temperature data, vehicle interior humidity data, steering wheel rotation angle data, vehicle exterior illumination data, data of pressure applied to an accelerator pedal, data of pressure applied to a brake pedal, etc.

As described above, according to the present disclosure, the vehicle state information acquired through the camera unit 111 and the sensing unit 114 may include at least one of vehicle speed, RPM, accelerator position state, throttle position state, brake input and pressure state, mission position state, coolant temperature, oxygen sensor state, exhaust temperature state, vacuum boost state, turbine boost state, voltage state, engine output state, wheel speed, intake air temperature, full cut state, air-fuel ratio state, steering angle sensor value, or G sensor value depending on the degree of manipulation of the vehicle 100 by the user or the driver.

In addition, for example, the driving pattern may include at least one of a driving guide line (steering angle), an accelerator pedal effort, braking timing, or a brake pedal effort. The driving pattern may be projected on the windshield of the vehicle 100 through the projection unit 115 under control of the driving guide processor 113.

The projection unit 115 may be a projector that projects various information related to the vehicle 100 on the windshield of the vehicle 100 positioned in front of the user. The projection unit 115 may project a ghost vehicle 11 for the vehicle 100 and other ghost vehicles 21 for the other vehicles 500 on the windshield of the vehicle 100 under control of the driving guide processor 113.

The projection unit 115 may project the optimal driving route in the driving route of the circuit while the vehicle 100 is driven on the driving route of the circuit under control of the driving guide processor 113, and may project information about the driving pattern of the user.

For example, the projection unit 115 may project the accelerator amount of the driver, a steering angle, and brake timing notification information in real time, so that the user or the driver may stably drive around the circuit. For example, the projection unit 115 may include augmented reality (AR)-navigation, an augmented reality head-up display (AR-HUD), etc.

The storage unit 116 is disposed in the vehicle 100, and may store driving information of the vehicle 100, circuit information, map information, driving information of the other vehicles 500, vehicle state information, a driving pattern of the driver, a driving rule of a preset circuit, and a driving guide program. The storage unit 116 may be a non-transitory memory including at least one type of storage medium among a flash memory type, a hard disk type, a multimedia card micro type such as an SD or XD memory, a random access memory (RAM), a static RAM (SRAM), a read-only memory (ROM), an electrically erasable programmable read-only memory (EEPROM), a programmable read-only memory (PROM), a magnetic memory, a magnetic disk, and an optical disk.

The storage unit 116 may divide the driving route of the circuit into a plurality of sections and store the driving route of the circuit for each section. That is, the storage unit 116 may store driving information of the vehicle 100, circuit information, map information, driving information of the other vehicles 500, vehicle state information, a driving pattern of the driver, a driving rule of a preset circuit, and a driving guide program for each section of the plurality of sections.

Figure 3:
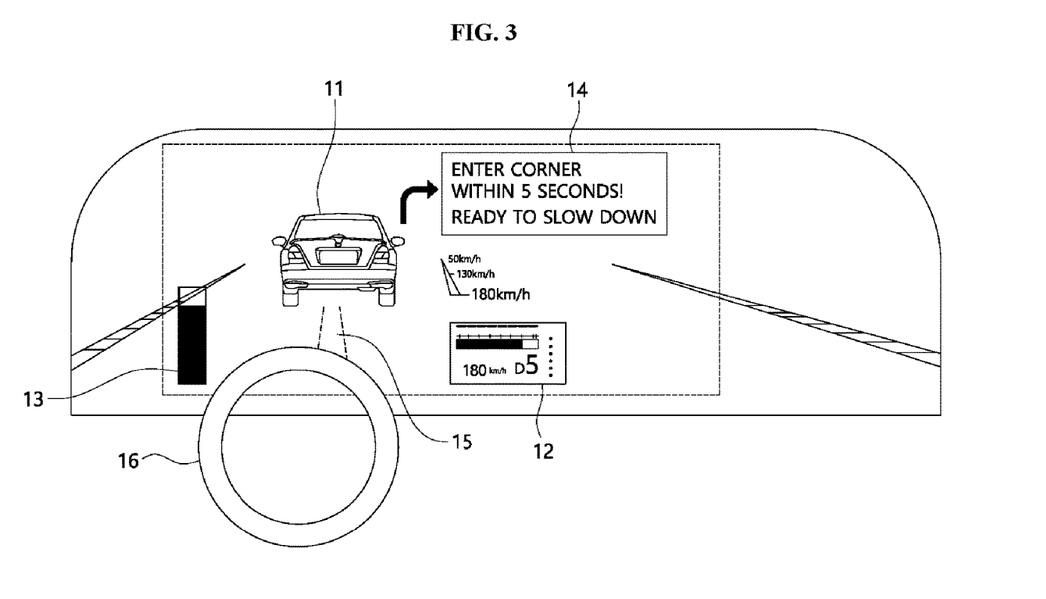
FIG. 3 is a diagram for describing various information of a virtual ghost vehicle projected on a windshield of the vehicle according to an embodiment of the present disclosure.

FIG. 3 is a diagram for describing various information of a virtual ghost vehicle projected on the windshield of the vehicle according to an embodiment of the present disclosure.

Referring to FIG. 3, the projection unit 115 according to an embodiment of the present disclosure may project various information related to the circuit, the vehicle 100, and the other vehicles 500 on the windshield of the vehicle 100 under control of the driving guide processor 113.

The projection unit 115 may project the virtual ghost vehicle 11 for the vehicle 100 on the windshield of the vehicle 100 under control of the driving guide processor 113. The projection unit 115 may project at least one of a driving guide line (steering angle), acceleration timing, an accelerator pedal effort, braking timing, a brake pedal effort, etc., which are driving patterns 12, 13, 14, and 15 of the driver, around the ghost vehicle 11 under control of the driving guide processor 113.

In other words, the driving guide processor 113 may provide the driver with real-time vehicle performance information and guidance of the ghost vehicle 11 in front during circuit driving by using the projection unit 115. For example, the driving guide processor 113 may provide the driver with the real-time vehicle 100 performance information and guidance in real time for a cornering course in a corner section, deceleration/gear shifting timing before entering the corner section, acceleration start/end timing in a straight section, etc. of the driving route of the circuit through the projection unit 115.

In addition, the driving guide processor 113 may perform a control operation to change the real-time vehicle performance information and guidance, etc. of the ghost vehicle 11 projected on the windshield of the vehicle 100 through the projection unit 115 according to selection or preference of the driver.

Figure 4:
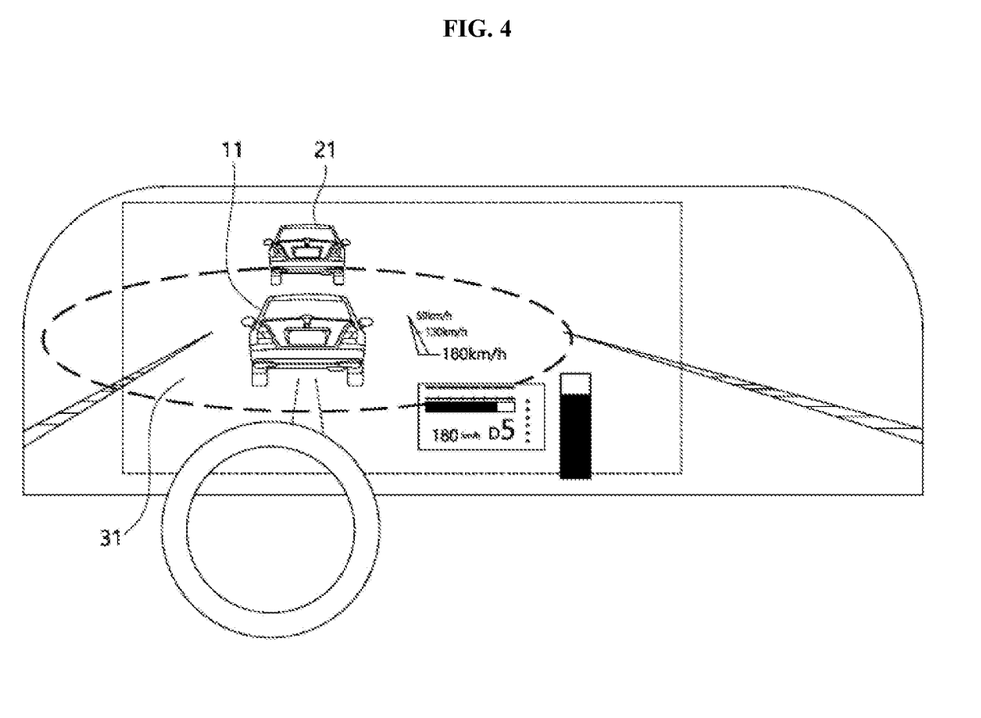
FIG. 4 is a diagram for describing a relationship between the virtual ghost vehicle and another virtual ghost vehicle projected on the windshield of the vehicle according to an embodiment of the present disclosure.

FIG. 4 is a diagram for describing a relationship between the virtual ghost vehicle and another virtual ghost vehicle projected on the windshield of the vehicle according to an embodiment of the present disclosure.

Referring to FIG. 4, when another vehicle 500 is detected in front or behind the vehicle 100 during circuit driving, the driving guide processor 113 may project the other virtual ghost vehicle 21 together with the ghost vehicle 11 on the projection unit 115.

When at least one other vehicle 500 approaches within a preset range 31 around on the vehicle 100, the driving guide processor 113 may perform a control operation to interact with the driving information of the other vehicle 500 to change the optimal driving route.

For example, when another vehicle 500 is detected from the front while driving on the circuit driving route and the other virtual ghost vehicle 21 approaches the front within the preset range 31, the driving guide processor 113 induces a decrease in speed/RPM of the virtual ghost vehicle 11, thereby guiding the user in safely driving without colliding with the other vehicle 500 driven in front.

For example, when another vehicle 500 is detected from the front during driving on the circuit driving route, and an overtaking permission signal is transmitted from the other vehicle 500 through the communication module 112, the driving guide processor 113 may confirm the signal and induce the ghost vehicle 11 to be driven by overtaking the other ghost vehicle 21 driven in front, thereby guiding the user in safely overtaking without colliding with the other vehicle 500 driven in front.

For example, when another vehicle 500 driven at a speed faster than a current speed of the vehicle 100 is detected from the rear during driving on the circuit driving route, the driving guide processor 113 may induce the virtual ghost vehicle 11 to be driven to a corner of the circuit, thereby guiding the other vehicle 500 driven behind to safely overtake the vehicle 100 of the driver.

Figure 5:
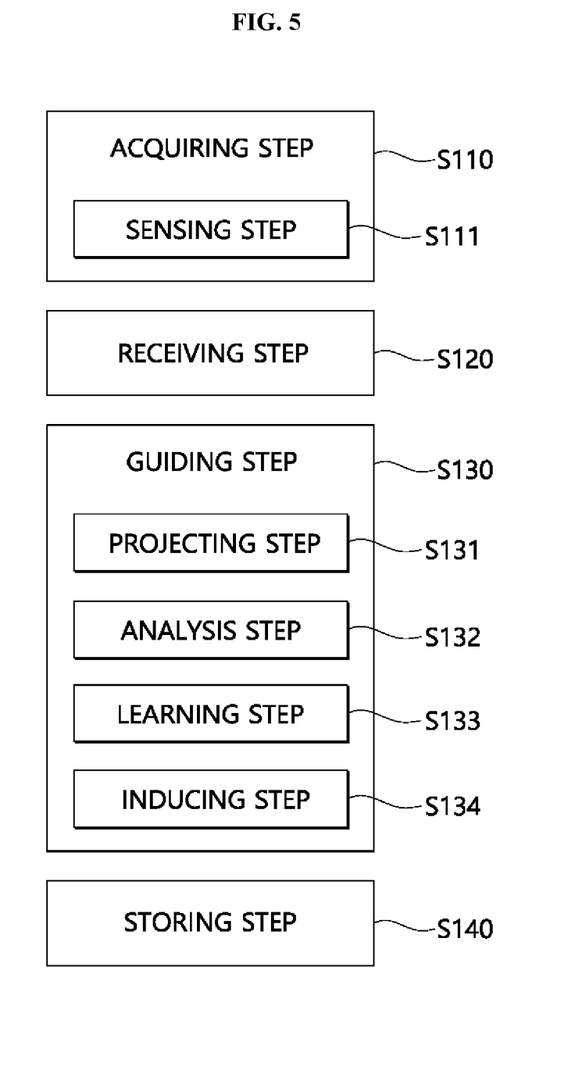
FIG. 5 is a diagram for describing a circuit driving guide method according to an embodiment of the present disclosure.

FIG. 5 is a diagram for describing a circuit driving guide method according to an embodiment of the present disclosure.

Referring to FIG. 5, the circuit driving guide method according to the embodiment of the present disclosure may include an acquiring step (S110), a receiving step (S120), and a guiding step (S130).

In the acquiring step (S110), driving information of the vehicle 100 and circuit information provided for each event occurring during driving on the driving route of the circuit may be acquired in the vehicle 100 driven on the driving route of the circuit using a plurality of cameras disposed in the vehicle 100.

In the receiving step (S120), map information on the driving route of the circuit and driving information of another vehicle 500 among one or more other vehicles 500 driven on the driving route of the circuit may be received from the circuit server 300.

In the guiding step (S130), under control of the driving guide processor 113, driving information of the vehicle 100 and circuit information acquired from the camera unit 111, map information provided from the circuit server 300, and driving information of the other vehicle 500 may be analyzed, and an analyzed result value may be applied to a driving rule of a preset circuit to guide the user in driving.

The acquiring step (S110) may include a sensing step (S111). In the sensing step (S111), at least one sensing unit 114 disposed in the vehicle 100 may be used to sense vehicle state information and a driving pattern of the user in the vehicle 100 driven on the driving route of the circuit.

The guiding step (S130) may include a projecting step (S131). In the projecting step (S131), the projection unit 115 disposed in the vehicle 100 may be used to project various information related to the vehicle 100 on the windshield of the vehicle 100 located in front of the user.

In the projecting step (S131), the projection unit 115 may be used to project the ghost vehicle 11 for the vehicle 100 and another ghost vehicle 21 for the other vehicle 500 on the windshield of the vehicle 100.

In addition, the guiding step (S130) may include an analysis step (S132), a learning step (S133), and an inducing step (S134).

In the analysis step (S132), at least one of driving information of the vehicle 100, circuit information, map information, driving information of the other vehicle 500, vehicle state information, or a driving pattern of the user may be collected and analyzed.

In the learning step (S133), a result value analyzed through the analysis unit 113*a* may be applied to the driving rule of the preset circuit to perform learning.

In the inducing step (S134), it is possible to induce the user to be guided in driving based on a driving guide program learned through the learning unit 113*b*. In the inducing step (S134), it is possible to set an optimal driving route for the driving route of the circuit based on the learned driving guide program, and induce the user to be guided in driving based on the set optimal driving route.

In addition, in the guiding step (S130), the driving route of the circuit may be divided and controlled for each section.

In addition, in the guiding step (S130), when one or more other vehicles 500 approach within a preset range around the vehicle 100, it is possible to perform a control operation to interact with driving information of the other vehicles 500 and determine a change of the optimal driving route.

In addition, in a storing step (S140), the driving information of the vehicle 100, the circuit information, the map information, the driving information of the other vehicles 500, the vehicle state information, the driving pattern of the user, the driving rule of the preset circuit, and the driving guide program may be stored in at least one storage unit 116 disposed in the vehicle 100. In the storing step (S140), the driving route of the circuit may be divided and stored for each section.

A detailed description of the circuit driving guide method according to the embodiment of the present disclosure described above will be omitted since the circuit driving guide method has been sufficiently described with reference to FIGS. 1 to 4.

Figure 6:
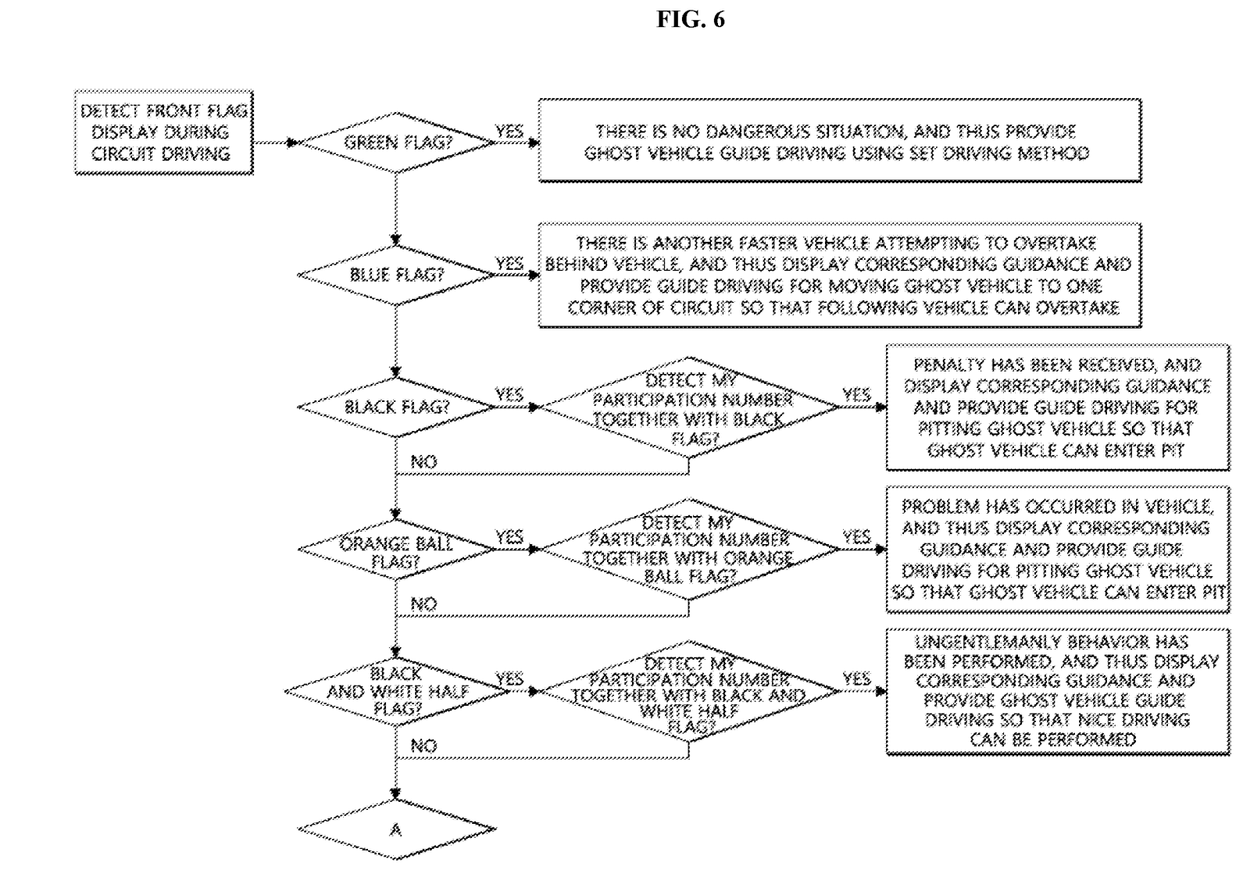
FIGS. 6 and 7 are diagrams for describing a method of guiding a vehicle using circuit information according to an embodiment of the present disclosure.
Figure 7:
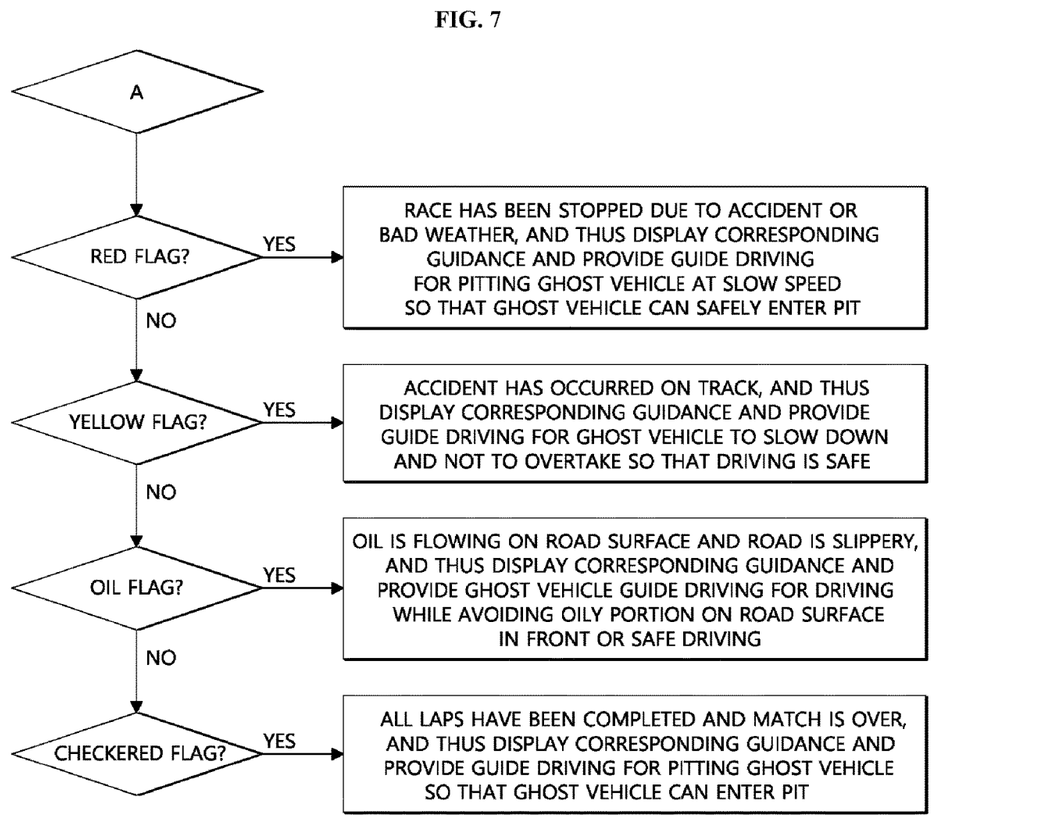

FIGS. 6 and 7 are diagrams for describing a method of guiding the vehicle using circuit information according to an embodiment of the present disclosure.

Referring to FIG. 6, in the circuit driving guide method according to an embodiment of the present disclosure, circuit information may be extracted from a flag display acquired through the camera unit 111, and the vehicle 100 may be safely guided using the extracted circuit information.

In more detail, when a specific situation occurs during circuit driving, and a flag suitable for the situation is displayed, the circuit driving guide device 110 detects this display, the virtual ghost vehicle 11 resets an optimal driving route suitable for the situation, and the reset optimal driving route is projected on the windshield of the vehicle 100 through the projection unit 115, so that it is possible to guide the user in safely solving the specific situation.

First, the circuit driving guide device 110 may detect a front flag display during circuit driving through the camera unit 111.

When the detected flag is a green flag, this means that there is no dangerous situation, and thus the circuit driving guide device 110 may guide the ghost vehicle 11 to be driven on the preset optimal driving route, which is a driving method set using the projection unit 115.

In addition, when the detected flag display is a blue flag instead of the green flag, this means that there is another faster vehicle 500 attempting to overtake the vehicle, and thus the circuit driving guide device 110 may display corresponding guidance on the projection unit 115, and guide the ghost vehicle 11 to be moved to one corner of the circuit so that the other vehicle 500 driven behind can overtake.

In addition, when the detected flag display is a black flag instead of the blue flag, and a participation number of the subject vehicle 100 is detected together with the black flag, this means that a penalty has been received, and thus the circuit driving guide device 110 may display corresponding guidance on the projection unit 115, and guide the ghost vehicle 11 while pitting the ghost vehicle 11 so that the ghost vehicle 11 can enter a pit.

In addition, when the detected flag display is an orange ball flag instead of the black flag, and a participation number of the subject vehicle 100 is detected together with the orange ball flag, this means that a problem has occurred in the vehicle 100, and thus the circuit driving guide device 110 may display corresponding guidance on the projection unit 115, and guide the ghost vehicle 11 while pitting the ghost vehicle 11 so that the ghost vehicle 11 can enter a pit.

In addition, when the detected flag display is a black and white half flag instead of the orange ball flag, and a participation number of the subject vehicle 100 is detected together with the black and white half flag, this means that an ungentlemanly behavior has been performed, and thus the circuit driving guide device 110 may display corresponding guidance on the projection unit 115, and guide the ghost vehicle 11 to be driven nicely.

In addition, when the detected flag display is a red flag instead of the black and white half flag, this means that a race has been stopped due to an accident or bad weather, and thus the circuit driving guide device 110 may display corresponding guidance on the projection unit 115, and guide the ghost vehicle 11 while pitting the ghost vehicle 11 at a slow speed so that the ghost vehicle 11 can safely enter the pit.

In addition, when the detected flag display is a yellow flag instead of the red flag, this means that an accident has occurred on a circuit track, and thus the circuit driving guide device 110 may display corresponding guidance on the projection unit 115, and guide the ghost vehicle 11 to be slowed down and not to overtake so that driving is safe.

In addition, when the detected flag display is an oil flag instead of the yellow flag, this means that oil is flowing on a road surface and the road is slippery, and thus the circuit driving guide device 110 may display corresponding guidance on the projection unit 115, and guide the ghost vehicle 11 to be driven safely or driven while avoiding an oily portion on the road surface in front.

In addition, when the detected flag display is checkered flag instead of the oil flag, this means that all laps have been completed and a match is over, and thus the circuit driving guide device 110 may display corresponding guidance on the projection unit 115, and guide the ghost vehicle 11 while pitting the ghost vehicle 11 so that the ghost vehicle 11 can enter the pit.

The display order of flag types in the present disclosure described above is an example for understanding, and thus the present disclosure is not limited thereto.

In at least one embodiment of the present disclosure configured as described above, the circuit driving guide device and method may provide the driver with real-time vehicle performance information and guidance of a front ghost vehicle during circuit driving in real time, thereby safely guiding the user in circuit driving and improving driving skills of the driver at the same time.

In addition, in at least one embodiment of the present disclosure, the circuit driving guide device and method may project an interaction between a vehicle in circuit driving and a plurality of other vehicles on a windshield of the vehicle, thereby safely guiding the user in circuit driving.

In addition, according to the present disclosure, it is possible to support the driver so that the driver can drive while improving driving skills by guiding the driver on an optimal driving route according to a driving route of a circuit or a section of the circuit.

In addition, according to the present disclosure, it is possible to practice circuit driving in an actual circuit environment by providing a circuit driving guide device that assists in improving driving skills and safety in an environment in which a plurality of other vehicles is simultaneously driven on a circuit.

The effects obtainable in the present disclosure are not limited to the above-mentioned effects, and other effects not mentioned herein may be clearly understood by those of ordinary skill in the art to which the present disclosure belongs from the above description.

The present disclosure described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

It will be apparent to those skilled in the art that various modifications and variations can be made in the present disclosure without departing from the spirit or scope of the present disclosure. Thus, it is intended that the present disclosure cover the modifications and variations thereof provided they come within the scope of the appended claims and their equivalents.

What is claimed is:

1. A circuit driving guide device comprising:
    at least one camera unit disposed in a first vehicle, the at least one camera unit being configured to acquire driving information of the first vehicle driven on a driving route of a circuit and circuit information provided for each event occurring during driving on the driving route of the circuit;
    a communication module disposed inside the first vehicle, the communication module being configured to receive, from a circuit server, map information of the driving route of the circuit and driving information of a second vehicle among one or more other vehicles driven on the driving route of the circuit; and
    a driving guide processor disposed inside the first vehicle, the driving guide processor being configured to guide a user in driving by analyzing the driving information of the first vehicle and the circuit information acquired from the at least one camera unit, and the map information and the driving information of the second vehicle provided from the communication module, and by applying an analyzed result value, obtained from the analyzing of the driving guide processor, to a driving rule of a preset circuit.

2. The circuit driving guide device according to claim 1, further comprising at least one sensing unit disposed in the first vehicle, the at least one sensing unit being configured to obtain state information of the first vehicle and a driving pattern of the user in the first vehicle driven on the driving route of the circuit.

3. The circuit driving guide device according to claim 2, further comprising a projection unit disposed in the first vehicle and configured to project various information related to the first vehicle on a windshield of the first vehicle located in front of the user,
    wherein the driving guide processor performs a control operation to project a ghost vehicle for the first vehicle and another ghost vehicle for the second vehicle on the windshield of the first vehicle using the projection unit.

4. The circuit driving guide device according to claim 3, wherein the driving guide processor includes:
    an analysis unit configured to collect and analyze at least one of the driving information of the first vehicle, the circuit information, the map information, the driving information of the second vehicle, the state information of the first vehicle, or the driving pattern of the user;
    a learning unit configured to apply a result value analyzed through the analysis unit to the driving rule of the preset circuit to perform learning; and
    a guide unit configured to guide the user in driving based on a driving guide program learned through the learning unit.

5. The circuit driving guide device according to claim 4, wherein the guide unit sets an optimal driving route for the driving route of the circuit based on the learned driving guide program, and guides the user in driving based on the optimal driving route.

6. The circuit driving guide device according to claim 5, wherein the driving guide processor performs a control operation by dividing the driving route of the circuit into a plurality of sections.

7. The circuit driving guide device according to claim 6, further comprising a storage unit disposed in the first vehicle and configured to store the driving information of the first vehicle, the circuit information, the map information, the driving information of the second vehicle, the state information of the first vehicle, the driving pattern of the user, the driving rule of the preset circuit, and the driving guide program,
    wherein the storage unit performs storing of the driving information of the first vehicle, the circuit information, the map information, the driving information of the second vehicle, the state information of the first vehicle, the driving pattern of the user, the driving rule of the preset circuit, and the driving guide program, for each section of the plurality of sections of the driving route of the circuit.

8. The circuit driving guide device according to claim 7, wherein, when the one or more other vehicles approach within a preset range around the first vehicle, the driving guide processor performs a control operation to interact with the driving information of the second vehicle and change the optimal driving route.

9. The circuit driving guide device according to claim 3, wherein:
- the driving pattern includes at least one of a driving guide line (steering angle), an accelerator pedal effort, braking timing, or a brake pedal effort; and
- the driving pattern is projected on the windshield of the first vehicle through the projection unit under control of the driving guide processor.

10. The circuit driving guide device according to claim 3, wherein the projection unit includes at least one of augmented reality (AR)-navigation or an augmented reality head-up display (AR-HUD).

11. A non-transitory computer-readable recording medium recording a program for executing the circuit driving guide device according to claim 1.

12. A circuit driving guide method comprising:
- acquiring, by at least one camera unit, driving information of a first vehicle driven on a driving route of a circuit and circuit information provided for each event occurring during driving on the driving route of the circuit;
- receiving, by a communication module, from a circuit server, map information of the driving route of the circuit and driving information of a second vehicle among one or more other vehicles driven on the driving route of the circuit; and
- guiding, by a driving guide processor, a user in driving by analyzing the driving information of the first vehicle and the circuit information acquired from the at least one camera unit, and the map information and the driving information of the second vehicle provided from the circuit server under control of the driving guide processor, and applying an analyzed result value, obtained from the analyzing of the driving guide processor, to a driving rule of a preset circuit.

13. The circuit driving guide method according to claim 12, wherein the acquiring includes obtaining state information of the first vehicle and a driving pattern of the user in the first vehicle driven on the driving route of the circuit using the at least one sensing unit disposed in the first vehicle.

14. The circuit driving guide method according to claim 13, wherein:
- the guiding includes projecting various information related to the first vehicle on a windshield of the first vehicle located in front of the user using a projection unit disposed in the first vehicle; and
- the projecting includes projecting a ghost vehicle for the first vehicle and another ghost vehicle for the second vehicle on the windshield of the first vehicle using the projection unit.

15. The circuit driving guide method according to claim 14, wherein the guiding further includes:
- collecting and analyzing at least one of the driving information of the first vehicle, the circuit information, the map information, the driving information of the second vehicle, the state information of the first vehicle, or the driving pattern of the user;
- applying a result value analyzed in the collecting and analyzing to the driving rule of the preset circuit to perform learning; and
- guiding the user in driving based on a driving guide program learned through the applying and learning.

16. The circuit driving guide method according to claim 15, wherein the guiding includes setting an optimal driving route for the driving route of the circuit based on the learned driving guide program, and guiding the user in driving based on the optimal driving route.

17. The circuit driving guide method according to claim 16, wherein the guiding includes performing a control operation by dividing the driving route of the circuit into a plurality of sections.

18. The circuit driving guide method according to claim 16, further comprising storing the driving information of the first vehicle, the circuit information, the map information, the driving information of the second vehicle, the state information of the first vehicle, the driving pattern of the user, the driving rule of the preset circuit, and the driving guide program in a storage unit disposed in the first vehicle,
- wherein the storing includes performing storing of the driving information of the first vehicle, the circuit information, the map information, the driving information of the second vehicle, the state information of the first vehicle, the driving pattern of the user, the driving rule of the preset circuit, and the driving guide program, for each section of the plurality of sections.

19. The circuit driving guide method according to claim 18, when the one or more other vehicles approach within a preset range around the first vehicle, wherein the guiding includes performing a control operation to interact with the driving information of the second vehicle and change the preset optimal driving route.

20. The circuit driving guide method according to claim 14, wherein:
- the driving pattern includes at least one of a driving guide line (steering angle), an accelerator pedal effort, braking timing, or a brake pedal effort; and
- the driving pattern is projected on the windshield of the first vehicle through the projection unit under control of the driving guide processor.

* * * * *